United States Patent [19]

Kirschmann

[11] 4,135,984
[45] Jan. 23, 1979

[54] WATER DISTILLER

[76] Inventor: John D. Kirschmann, 933 Anderson St., Bismarck, N. Dak. 58501

[21] Appl. No.: 738,633

[22] Filed: Nov. 3, 1976

[51] Int. Cl.² .............................................. B01D 3/02
[52] U.S. Cl. .................................... 202/83; 202/196; 202/206
[58] Field of Search ................ 202/83, 185 C, 185 E, 202/189, 190–193, 160, 234, 194, 195, 196, 181, 206; 196/121; 203/100; 159/DIG. 1, DIG. 26

[56] References Cited

U.S. PATENT DOCUMENTS

| 616,277 | 12/1898 | Todd et al. | 202/185 E |
|---|---|---|---|
| 1,314,790 | 9/1919 | Crane | 202/185 C |
| 2,398,842 | 4/1946 | Morse | 202/189 |
| 3,055,810 | 9/1962 | Skow | 202/202 |
| 3,350,279 | 10/1967 | Tollhin | 202/83 |
| 3,830,705 | 8/1974 | Dewegeli | 202/83 |
| 3,838,016 | 9/1974 | Powers | 202/181 |
| 3,935,077 | 1/1976 | Dennison | 202/83 |

*Primary Examiner*—Hiram H. Bernstein
*Attorney, Agent, or Firm*—Williamson, Bains, Moore & Hansen

[57] ABSTRACT

A water distiller assembly comprising a bottom boiler unit and a top condensing unit incorporates heat exchange passage means for supply water and steam arranged in the condensing unit in such a way in combination with tubular flow connections between the condensing unit and boiler unit that cool, incoming supply water is preheated by steam rising from the boiler unit and flows by gravity down into the boiler unit, with the steam thereby being cooled and condensed to distilled water. Mineral laden residue water in the boiler unit is discharged therefrom continuously by means of a discharge passage providing a predetermined flow restriction against the flow pressure generated by the vapor pressure in the boiler unit. A supply water vessel forming a portion of the condensing unit is removably secured to the top of a boiler vessel by spring clips, which also serve to tightly seat lids covering the supply water vessel and the boiler vessel.

11 Claims, 7 Drawing Figures

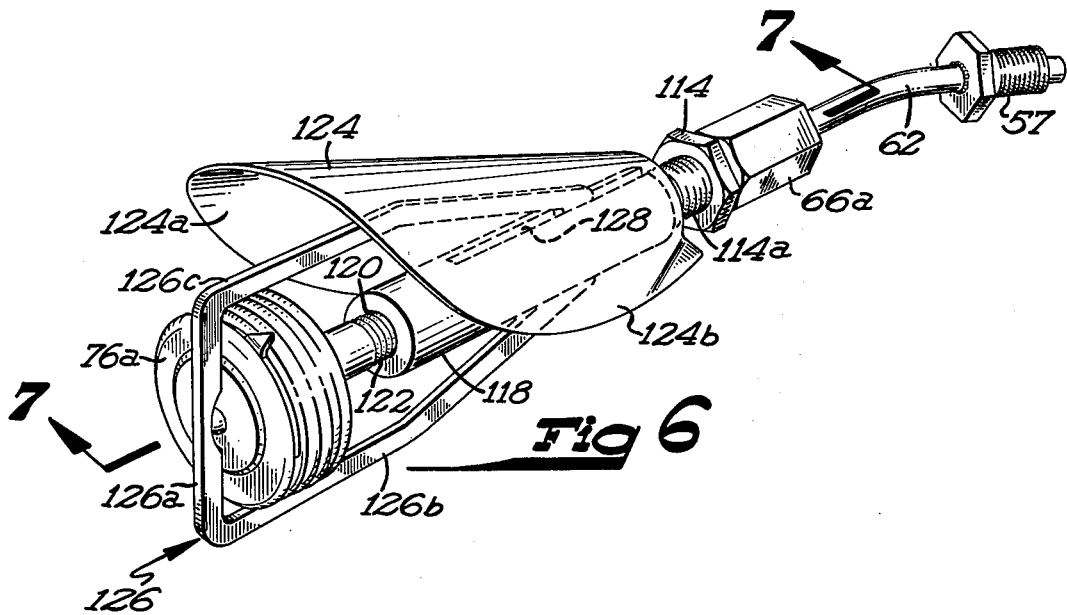
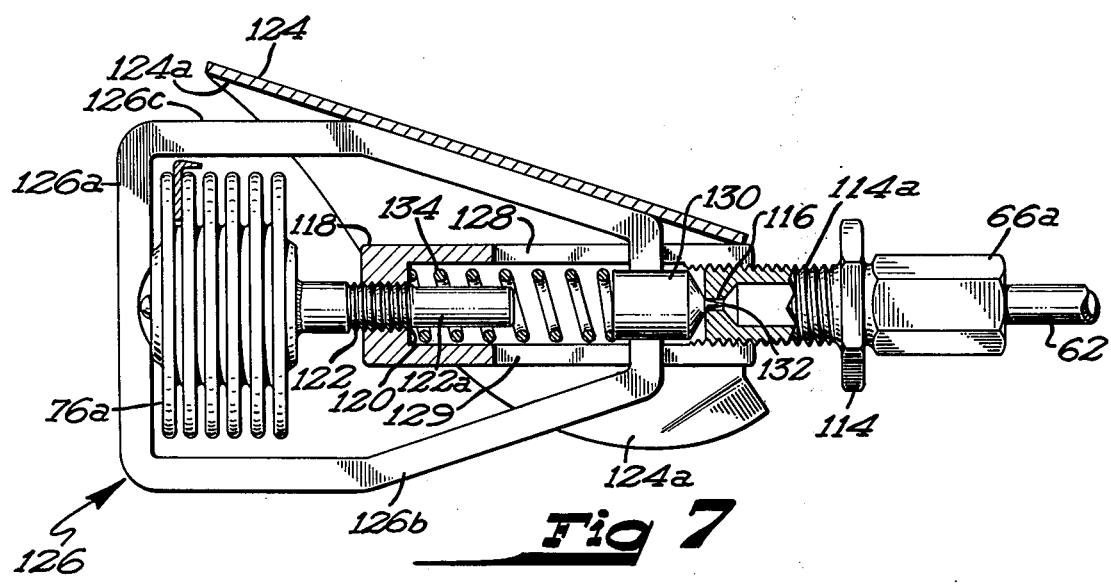

WATER DISTILLER

BACKGROUND OF THE INVENTION

Water distillers of various designs and construction, including household water distillation systems, have been in use and known for some time. See, for example, U.S. Pat. No. 3,687,817, issued to B. D. Jimerson et al. This patent, as well as U.S. Pat. No. 3,055,810 issued to R. E. Skow disclose relatively large, cumbersome assemblies of apparatus for distilling water, which would not be readily adaptable to household use in the form of a small, compact appliance. It is also known to utilize the incoming supply water as a cooling agent for cooling and condensing steam to distilled water in such apparatus as is disclosed in the aforesaid patent to Skow, and in U.S. Pat. No. 3,736,234 issued to Shiro Miyamoto. The patents to Jimerson et al. and Skow further teach the desirability of providing a flushing or draining system for removing impurities from the boiler unit of a water distiller.

The water distiller invention disclosed herein incorporates certain ones of these prior art features in combination with new and improved features to provide a small, compact household water distiller effectively utilizing cool supply water to condense steam in a thermostatically controlled, gravity flow arrangement for incoming water. The water distiller unit is of simple, take-apart construction comprising a top, condensing unit and a bottom, boiler unit removably secured together with tightly sealed, cover lids for ready access and servicing.

BRIEF SUMMARY OF THE INVENTION

The water distiller of this invention is particularly characterized by a small, efficient distiller assembly of take-apart construction which requires no external cooling source for condensing steam to distilled water, provides distilled water at a desired temperature level by an adjustable thermostatic flow control on the incoming supply water, and which avoids the accumulation of undue amounts of mineral deposits in a boiler unit.

These basic objectives are accomplished in a particularly effective and improved way by utilizing a combination of a bottom boiler unit and a top condensing unit removably attached thereto, with a supply water connection to the condensing unit through which relatively cool supply water is directed into a heat exchange passage for cooling and condensing steam rising into the condensing unit from the boiler unit. A flow tube extending between the condensing unit and the boiler unit through a removable lid on the top of a boiler vessel is constructed and positioned to direct preheated supply water from the condensing unit downwardly by gravity flow to a discharge location below the normal water level in the boiler unit.

Preferably, the condensing unit comprises a vessel in which supply water is maintained at a predetermined level in heat exchange relation with steam passing through a circuitous, tubular passage from the boiler, with the result that the steam is cooled and condensed to distilled water which is directed outwardly from the unit through a fluid outlet. Steam rising from the bottom boiler unit is directed into the top of the circuitous tubular passage in the condensing unit, whereby condensing and cooled vapors flow downwardly in the circuitous flow passage towards the fluid outlet for distilled water, and a temperature gradient is maintained in the supply water contained in the condensing vessel. The cool supply water is thereby located at the bottom of the condensing vessel, and preheated supply water at a higher temperature will be at the top of the condensing vessel for introduction into the aforesaid flow tube extending downwardly into the boiler vessel. Advantageously, an adjustable thermostat positioned in the condensing unit regulates the flow of supply water into the condensing vessel through an inlet valve in response to the temperature of outgoing distilled water to thereby maintain the temperature of the distilled water product within a predetermined temperature range.

A further advantageous feature of the water distiller resides in the provision of a mineral water discharge passage in the lower portion of the boiler vessel, with an inlet at a predetermined water level therein, and an outlet leading externally of the boiler unit. This discharge passage is sized and shaped to provide a predetermined restriction to the outflow of residue water from the boiler under the pressurizing influence of vapor pressure generated in the boiler. As a result, a steady, predetermined outflow of mineral laden residue water is maintained from the boiler vessel to prevent the accumulation of minerals and other impurities therein. Preferably, the mineral water discharge passage takes the form of an upwardly facing, fluid receptacle positioned on the bottom of the boiler vessel, having an open top end serving as the inlet to the mineral water discharge passage at a predetermined water level in the boiler. An elongated tube of predetermined cross section extends from the inside of this fluid receptacle upwardly and outwardly from the boiler.

The aforesaid boiler unit comprises a boiler vessel having a removable lid held tightly in place by releasable spring clips engaging a lid on the condensing unit vessel at their upper ends and releasably secured to an outer, peripheral portion of the boiler unit at their bottom ends. The top mounted condensing unit and the bottom boiler unit are interconnected in such a way that the elongated spring clips not only secure the condensing unit and boiler unit together, but also force both the condenser vessel lid and the boiler vessel lid into tight, sealing engagement with the top edge portions of these vessels.

These and other objects and advantages of the invention disclosed herein will be readily apparent as the following description is read in conjunction with the accompanying drawings wherein like reference numerals designate like elements throughout these several views.

BRIEF DESCRIPTION OF THE DRAWINGS

FIG. 6 shows a modified form of the thermostatic controller; and

FIG. 7 is a section view of the modified controller taken along lines 7—7 of FIG. 6.

DESCRIPTION OF THE PREFERRED EMBODIMENT

Figure 1:
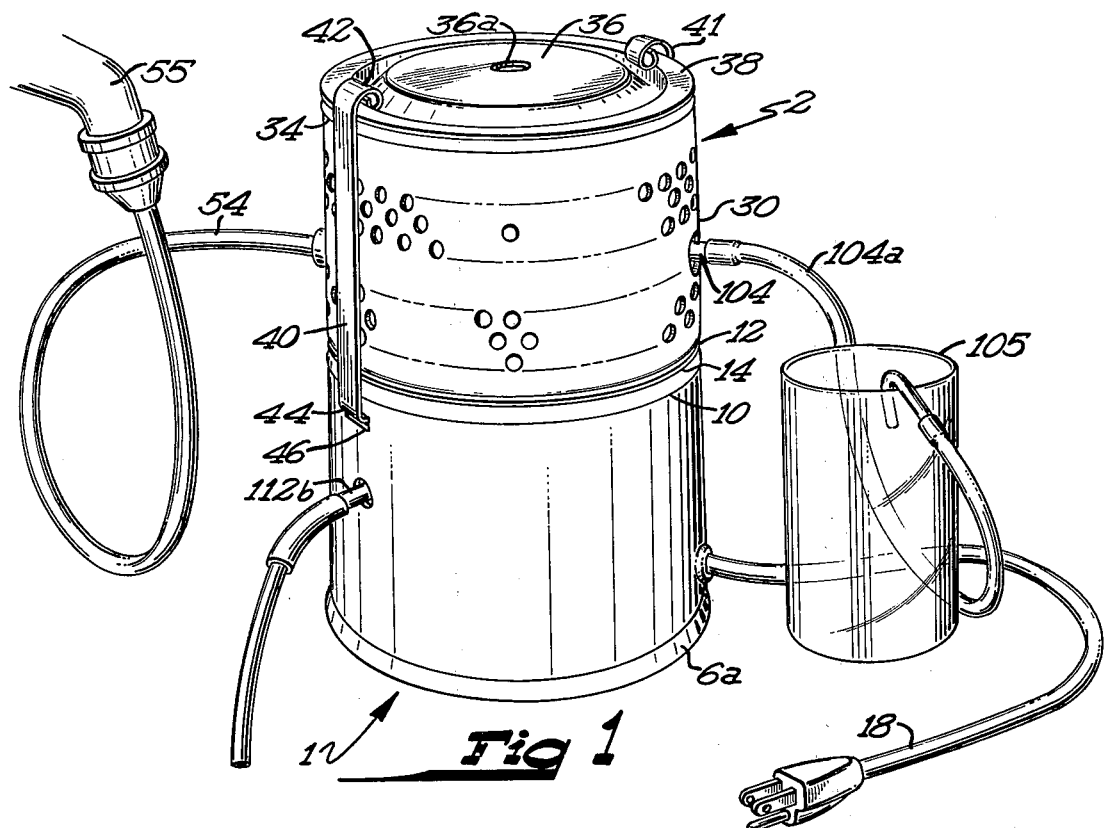
FIG. 1 is a perspective view of the improved water distiller of this invention.
Figure 2:
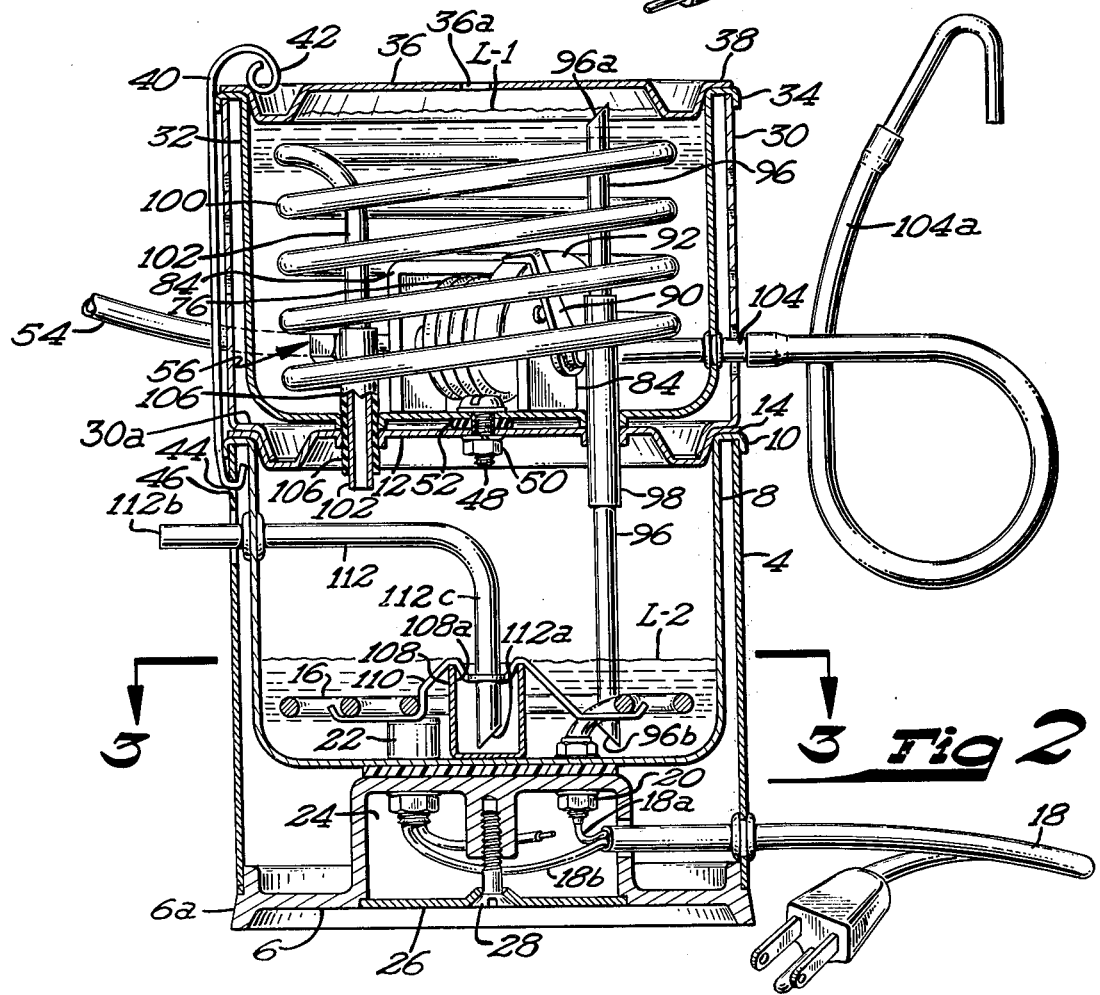
FIG. 2 is a vertical section view of the water distiller of FIG. 1.
Figure 3:
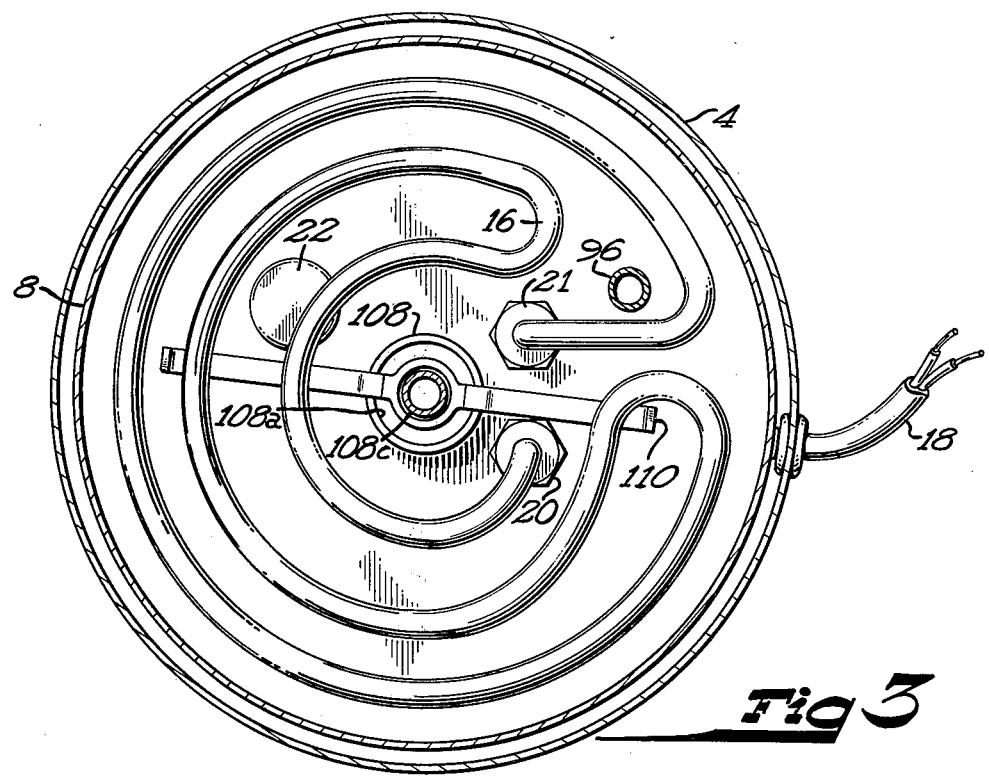
FIG. 3 is a horizontal section view of the water distiller taken along lines 3—3 of FIG. 2.

In the drawings FIGS. 1 through 3 illustrate the preferred form of the water distiller of this invention as a small, compact household appliance. The water distiller is comprised of a base or boiler unit 1 and a condensing unit 2 removably mounted on top thereof. The boiler unit has an outer cylindrical shield 4 for safety purposes, this cylindrical shield being supported on a base 6. An offset shoulder 6a on the outer periphery of base 6 serves as a seat for the bottom of shield 4. The boiler unit is further comprised of a boiling vessel 8 which defines a boiling chamber in which supply water is boiled as an essential step in the distillation operation. The top end of boiling vessel 8 is provided with outwardly turned flanges 10 which are hooked over the top of cylindrical shield 4 for support thereon as shown in FIG. 2. A removable boiler lid 12 rests on top of boiler vessel 8, and has a sealing lip 14 extending around its periphery. Lip 14 of boiler lid 12 is held in tight, sealing engagement with the top peripheral surface of boiler vessel 8 in a manner hereinafter set forth.

An electrical heating element 16 of coiled configuration as shown in FIG. 3 is utilized for heating supply water in boiler vessel 8. A power supply cord 18 extending through the outer shield 4 of boiler unit 1 has leads 18a and 18b connected to heating element 16 through fittings 20 and 21 in the bottom of boiler vessel 8. A thermostat 22 is connected in series with heating element lead wires 18a and 18b. Thermostat 22 projects within boiler vessel 8 in close proximity to heating element 16 and serves to interrupt the circuit to heating element 16 in response to an excessively high temperature in boiler vessel 8, as would be encountered if the level of supply water therein dropped abnormally low due to an operating malfunction. The electrical connections for thermostat 22 and heating element 16 are housed within a recess 24 formed in the bottom of base plate 6. This recess is normally covered by an access cap 26 held in place by screw 28.

Upper, condensing unit 2 is also provided with a cylindrical shield 30. This shield is perforated as shown for heat dissipation to provide an added cooling effect in condensing steam to distilled water in the condensing unit. Although the condensing unit may take various forms in order to provide a heat exchange passage for supply water to serve in cooling steam rising from boiler vessel 8, the condenser unit is preferably comprised of a vessel 32 in which supply water is maintained at a predetermined level L-1 as indicated in FIG. 2. Condensing vessel 32 has outwardly turned flanges on its upper end defining hooked end portions 34 which are hooked over the top of cylindrical shield 30 for support thereon. The bottom end of shield 30 rests on the top, periphery of boiler lid 12, the bottom end segments 30a of shield 30 being shaped to conform to and abut against the peripheral sealing lip 14 on boiler lid 12. In this manner, cylindrical condenser shield 30 serves as a connecting means between condenser unit 2 and boiler unit 1 for a reason hereinafter explained. The top of condensing vessel 32 is covered by a lid 36 resting thereon. For purposes of manufacturing economy, lid 36 is preferably identical in shape to boiler lid 12, and is provided with a sealing lip 38 around its outer periphery which rests upon upper, hooked end portions 34 of condensing vessel 32. Vapor aperture 36a is provided in lid 36 for venting undesired gases from the supply water.

In order to removably secure condensing unit 2 on top of boiler unit 1, I utilize spring retention means which preferably take the form of detachable spring clips 40 and 41. Elongated spring clips 40, 41 are positioned at spaced apart locations around the periphery of the water distiller assembly as shown in FIGS. 1 and 2, with each of these clips having an upper end segment which engages a peripheral edge portion of condensing unit lid 36 and a bottom end segment removably secured to an outer, peripheral portion of boiler unit 1. To this end, spring clips 40 and 41 have rolled spring segments 42 at their top ends and hooked extensions 44 on their bottom ends. Rolled spring end segments 42 of clips 40, 41 bear against peripheral sealing lip 38 of condensing unit lid 36. Clips 40, 41 are attached to the water distiller assembly with their upper ends 42 thus engaging the periphery of condensing vessel lid 36. The spring clips 40, 41 are then forced downwardly to engage their bottom end hooks 44 in slots 46 formed in the boiler unit cylindrical shield 4. This has the effect of drawing condenser unit 1 and boiler unit 1 tightly together. With spring clips 40, 41 thus installed, upper rolled spring segments 42 thereof serve to hold sealing lip 38 of condensing vessel lid 36 tightly against the top periphery of condensing vessel 32. This eliminates the need for any additional sealing ring or sealing means of any type between lid 36 and condensing vessel 32. Moreover, the installation of spring clips 40, 41 in the aforesaid manner provides vertical, compression forces acting through condensing vessel lid 36 and interconnecting cylindrical shield 30 which serve to urge sealing lip 14 on boiler lid 12 into tight, sealing engagement with the top periphery of boiler vessel 8. Since cylindrical condenser shield 30 supports the peripheral shoulders of hooked upper ends 34 of condensing vessel 32 at its upper end and has its bottom end segments 30a bearing against peripheral sealing lip 14 of boiler lid 12, shield 30 serves to effectively transmit the compression forces of spring clips 40, 41 in such a way as to force sealing lip 14 of lid 12 tightly against the top of boiler vessel 8. Accordingly, no additional sealing means of any kind is required between boiler lid 12 and boiler vessel 8. Condensing unit 2 and boiler unit 1 are further interconnected by means of a screw 48 which fastens the bottom of condensing vessel 32 to boiler lid 12, and is held in place by nut 50 as shown in FIG. 2. A sealing grommet 52 around screw 48 prevents leakage through the bottom of condensing vessel 32 or the boiler lid 12. The detachment of spring clips 40 and 41 of course permits the removal of condensing vessel lid 36 to obtain access to the interior of the condensing unit. Also, the entire condensing unit 2 may then be removed from the top of boiler unit 1. As this is done, boiler lid 12 will be removed with the condensing unit, since it is attached thereto by screw 48. This permits access to the interior of boiler vessel 8.

Supply water is directed into the water distiller assembly through an inlet hose 54, which may be conveniently connected to a cold water sink tap 55 for ordinary household use. As most clearly appears in FIG. 4, supply hose 54 is connected through shield 30 with the interior of condensing vessel 32 by means of a fitting 56. Threaded end 57 of fitting 56 extends through the side wall of condensing vessel 32 and shield 30, and is attached to supply hose 54. Nut 58 fastened over the threaded end 57 of fitting 56, serves to tightly hold the fitting assembly to the wall of condensing vessel 32. A sealing gasket or ring 60 positioned around threaded end 57 of fitting 56 serves to prevent any leakage through the aperture in condensing vessel 32, through which threaded end 57 extends. Fitting 56 further includes a tubular member 62 projecting into the interior of condensing vessel 32 and having a valve fitting 64 secured to its inner end. Valve fitting 64 is threadedly secured to the outlet end of tubular extension 62 by means of a nut 66. Valve fitting 64 has a valve port 68, through which the flow of supply water is controlled by means of a movable valve element 70. Valve element 70 could take various forms, including that of a tapered pin. In the embodiment shown, a ball type valve 70 is utilized, and is held in place against valve seat or port 68 by means of a spring 72. The opposite end of spring 72 bears against a retainer ring 74.

Figure 4:
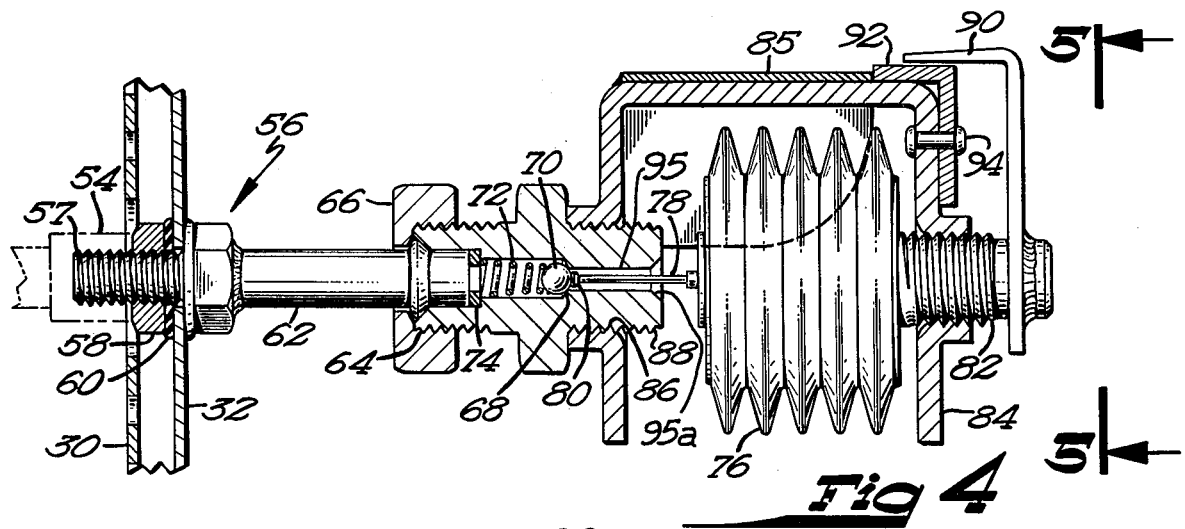
FIG. 4 is a fragmentary, section view of the thermostatic control on the supply water inlet of the water distiller shown in FIG. 2.

The flow rate of supply water through valve port 68 is controlled by a thermostat in order to provide the proper amount of supply water for cooling and distilling. The thermostat preferably comprises a bellows type of sensor and actuator 76, filled with an expansible fluid. Bellows 76 is positioned as shown in FIG. 2 within the interior of condensing vessel 32 where it will be immersed in supply water. An actuator stem 78 is connected to one end of bellows 76, and has a push head 80 on its opposite end, which normally bears against valve element 70. Bellows 76 is supported by a threaded extension 82 on one end thereof, which is screwed into an aperture in a mounting bracket 84. Bracket 84 is preferably of U-shaped configuration as shown in FIGS. 2 and 4, and includes a threaded aperture 86 at one end within which threaded extension 88 on valve fitting 64 is received. With mounting bracket 84 resting on the bottom of condensing vessel 32 in the manner shown in FIG. 2, it serves to support both bellows thermostat 76 and valve fitting 64.

Figure 5:
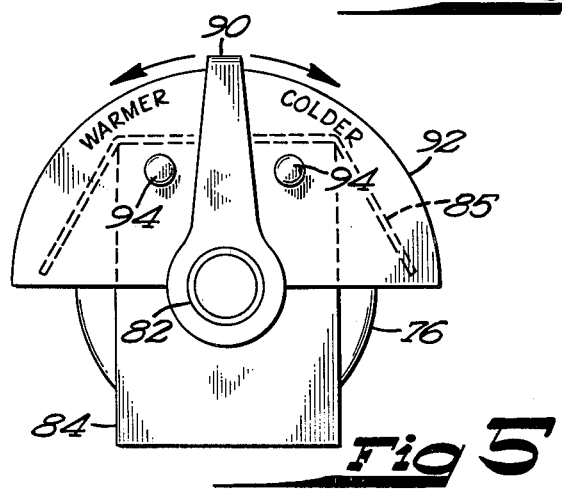
FIG. 5 is an end view of the thermostatic controller taken along lines 5—5 of FIG. 4.

An indicator and adjusting pointer 90 is affixed to the outer end of threaded thermostat extension 82 for rotation therewith. As is shown in FIGS. 4 and 5, pointer 90 is positioned to rotate back and forth over an indicator dial 92 affixed to one end of mounting bracket 84 by rivets 94. Pointer 90 may be rotated to the left or right as viewed in FIG. 5 to warmer or colder settings of the temperature for leaving distilled water. As pointer 90 is rotated, threaded thermostat extension 82 rotates with it, and is therefore screwed inwardly or outwardly with respect to the threaded aperture through which it extends in one end of mounting bracket 84. As a result, actuating stem 78 is moved laterally towards or away from valve element 70. In this manner, valve element 70 is moved towards a closing or opening position with respect to valve port 68 by the combination of valve spring 72 and actuating stem 78. Supply water flowing through inlet hose 54 is directed through tubular connecting member 62 of fitting 56 and past valve port 68 into outlet passage 95 of valve fitting 64. The water then flows through the discharge end 95a of valve outlet passage 95 into condensing vessel 32.

As noted above, relatively cool supply water is maintained at a predetermined level L-1 in condensing vessel 32. This is accomplished by means of a particular arrangement of a supply water outlet tube 96 leading to the interior of boiler vessel 8. Vertically oriented tube 96 extends downwardly through aligned apertures in the bottom of condensing vessel 32 and boiler lid 12, and is snugly secured therein by means of an insulating sleeve 98. Sleeve 98 may be made of rubber, plastic or other suitable insulating material with sufficient resiliency to provide a tight seal in the apertures in condensing vessel 32 and boiler lid 12 through which tube 96 extends. Tube 96 has an inlet opening 96a positioned in the upper portion of condensing vessel 32 at a predetermined level therein where the supply water level L-1 is to be maintained in vessel 32. At its bottom end, supply water tube 96 terminates at a discharge opening at 96b disposed below the normal level of supply water maintained in boiling vessel 8. The level of water maintained in boiler vessel 8 during normal operations is indicated by reference designation L-2 in FIG. 2. The length of supply water outlet tube 96 and the elevated location of its inlet opening 96a within condensing vessel 32 provide a column of supply water in tube 96 sufficient to at least balance and slightly exceed the vapor pressure generated in boiling chamber or vessel 8. This pressure head of supply water within tube 96 ensures a steady flow of supply water by gravity from the top of condensing vessel 32 downwardly into boiler vessel 8.

Steam generated in boiler vessel 8 is directed outwardly to a vapor flow passage 100 wherein it is cooled and condensed to distilled water. Efficiency and economy of operation are achieved by utilizing the relatively cool, incoming supply water as the heat exchange medium for cooling the steam passing through heat exchange passage 100. For this purpose, vapor flow passage 100 preferably takes the form of a circuitous, tubular member of coiled configuration as shown in FIG. 2. Vapor flow coil 100 is positioned within condensing vessel 32 wherein it will be in heat exchange relation with the cool supply water maintained therein at level L-1. It is to be noted that the upper end of spiral heat exchange coil 100 is disposed below the inlet 96a to supply water outlet tube 96, and therefore will normally be completely immersed in the supply water maintained at level L-1 in condensing vessel 32. Tubular inlet 102 leading to heat exchange coil 100 is disposed in fluid flow communication with the top of boiling chamber 8, and extends upwardly through aligned apertures in boiler lid 12 and in the bottom of condensing vessel 32. An insulating sleeve 106 of the same material as insulating sleeve 98 maintains a tight seal around inlet tube 102 where it passes through boiler lid 12 and the bottom of condensing vessel 32. It is to be noted that inlet tube 102 forms an integral part of heat exchange coil 100 and extends upwardly to the top thereof as shown in FIG. 2. As a result, steam vapors flow downwardly within heat exchange coil 100 through its spiral passages and are cooled by heat exchange with supply water maintained within condensing vessel 32. The condensed, distilled water produced by this heat exchange operation is directed outwardly from coil 100 through a tubular extension 104 of coil 100 projecting through the walls of condensing vessel 32 and cylindrical shield 30 to a point of connection with a distilled water delivery hose 104a. As is indicated in FIG. 1, distilled water thus produced may be directed through delivery hose 104a into a receiving vessel 105.

In the lower portion of boiler vessel 8 there is provided mineral water discharge passage means for the purpose of continuously moving concentrations of mineral residue from the bottom of the boiler unit. This passage means advantageously takes the form of a receiving cup or container 108 removably resting on the bottom of the boiler vessel 8. Cup 108 is normally held in place by a wire detent clip 110 which extends over the top of cup 108 and is hooked under spiral segments of electric heating coil 16 in the manner shown in FIGS. 2 and 3. Cup 108 is of a predetermined height to provide an inlet for mineral residue water defined by its open, upwardly facing, top end 108a. As is hereinafter explained, water is maintained in boiler vessel 8 at a level L-2 even with the top 108a of cup 108. Cup 108 serves as a fluid receptacle into which mineral laden residue water flows. The mineral water discharge tube 112 functions as the remaining portion of the mineral water discharge passage means. Tube 112 has an inlet 112a disposed within receiving cup 108 below the top 108a thereof. From its inlet 112a, tube 112 extends upwardly in a vertical segment 112c of predetermined height. Discharge tube 112 further includes a generally horizontally directed segment which projects outwardly through the walls of boiler vessel 8 and cylindrical boiler shield 4 and terminates in an outlet end 112b disposed externally of the water distiller assembly. The mineral water output from discharge tube 112 may be directed into any convenient type of drain or collecting vessel.

In operation, the supply water inlet hose 54 is connected to a cold water tap 55 or other suitable cold water supply, and power supply line 18 for the boiler unit is plugged into a suitable electrical receptacle. Cold supply water enters condensing vessel 32 through hose 54 and tubular passages or connections 62 and 95 of inlet fitting 56 and valve fitting 64. As supply water passes through thermostatically controlled inlet port 68, it is directed downwardly into condensing vessel 32 through discharge end 95a of outlet passage 95 in valve fitting 64. In order to ensure that incoming water under pressure is directed downwardly towards the bottom of condensing vessel 32, a deflecting shield 85 is attached to mounting bracket 84 for the thermostatic controller. Baffle or deflecting shield 85 may be welded or otherwise attached as shown in FIGS. 4 and 5 to the top of bracket 84. Shield 85 includes a horizontal segment as shown, and a pair of outwardly and downwardly extending wing segments which most clearly appear in FIG. 5. These wing extensions on deflector shield 85 serve to deflect and direct incoming supply water towards the bottom of condensing vessel 32. Supply water will rise within vessel 32 and reach a level L-1 therein, which is even with the inlet 96a to supply water outlet tube 96. The supply water is preheated by heat exchange with steam generated in boiler 8 and flowing outwardly through heat exchange coil 100. Preheated supply water flows downwardly by gravity through tube 96 into the bottom of boiler vessel 8, and is discharged through the bottom outlet 96b of tube 96 at a level below the top 108a of cup 108. As noted above, the level of water L-2 maintained in boiler vessel 8 corresponds to the top 108a of cup 108. The supply water is heated in boiler vessel 8 by the application of heat through electric heating elements 16. As a result, the supply water is boiled and vapor is generated in the form of steam which rises upwardly in boiler vessel 8. The rising steam passes into inlet 102 of heat exchange coil 100 and is directed upwardly therethrough to the top coil segments of spiral coil 100. As the steam flows downwardly through heat exchange coil 100 it is cooled and condensed to distilled water by heat exchange with the relatively cool inlet water maintained in condensing vessel 32 at a level L-1 therein. As noted above, distilled water flows outwardly through discharge tubular extension 104 and delivery hose 104a.

Since relatively cool supply water is initially directed into the bottom of condensing vessel 32, and hot steam generated in boiler vessel 8 is first directed into the top segments of coil 100 near the top of the body of supply water within vessel 32, a temperature gradient is established within the body of supply water in vessel 32. As supply water rises within vessel 32, it is heated by heat exchange with hot steam, with the maximum temperature of supply water being reached within vessel 32 near the top thereof by heat exchange with the hottest steam flowing first through the upper segments of coil 100. As a result, the hottest, preheated supply water flows into inlet 96a of supply water outlet tube 96 and is directed downwardly into boiler vessel 8. This efficient preheating and delivery of the hottest supply water from vessel 32 into boiler 8 greatly reduces the amount of heat which must be supplied through heating element 16 in order to boil the water. Operating experience has shown that the aforesaid, particular heat exchange arrangement between the cold supply water and steam passing through coil 100 results in the supply water being heated to temperatures on the order of 190° to 200° F. prior to introduction into the inlet 96a of supply water outlet tube 96. This of course means that an additional temperature increase of less than 25° is all that is required to bring the water to a boiling temperature of 212° within boiling vessel 8. The temperature gradient of the supply water within condensing vessel 32 is such that the supply water temperature will be on the order of 130° near the bottom of vessel 32, with a temperature of between 190° and 200° at the top thereof.

As noted above, supply water outlet tube 96 is of a predetermined height and size so as to maintain a predetermined head of supply water therein. This creates a pressure head of supply water, under gravity flow from the top condensing vessel 32, of a predetermined level which slightly exceeds the pressure generated in boiler 8. With the outlet 96b of supply water tube 96 disposed under the level of supply water in boiler vessel 8, the pressure in vessel 8 which must be overcome by the head of water in tube 96 will be the combination of the vapor pressure in vessel 8 and the head of water represented by level L-2. If the foregoing pressure balance is not maintained, with an excessive pressure being developed in boiler vessel 8, hot, mineral laden water will be forced from boiler vessel 8 upwardly through tube 96 back into condensing vessel 32 with obvious, undesirable results. A desired, continuous, gravity flow of supply water downwardly into boiler vessel 8 through supply tube 96 from condensing vessel 32 is maintained by the particular arrangement of condensing vessel 32 above boiler vessel 8, in combination with the aforesaid disposition of supply water tube 96.

Also, a desired, continuous outflow of mineral laden residue water is accomplished through discharge tube 112 by virtue of the vapor pressure acting on the body of water in the bottom of boiler vessel 8. Mineral water discharge tube 112 is sized and shaped as described above so as to provide a predetermined pressure drop on the outflow of mineral water. This is based on the particular vapor pressure generated within boiler vessel 8. If the pressure drop through discharge tube 112 is not great enough, the vapor pressure within vessel 8 will blow or force mineral water outwardly through tube 112 at an undesirable and unacceptable rate. The vertical rise 112c in discharge tube 112, coupled with its particular cross sectional area provides the desired pressure drop on the outflow of mineral laden water. The particular size and wattage of heating element 16 utilized will of course determine the pressure drop which must be maintained on the outflow of mineral water by means of discharge tube 112 and its receiving vessel or cup 108. With a vertical rise 112c as shown in FIG. 2, it has been determined that tube 112 should have a one-eighth inch internal diameter and a total length of at least 24 inches when a 1200 watt heating element is utilized. If a significantly shorter discharge tube 112 of 20 inches or less is utilized with this same 1200 watt heater, mineral water is blown at an unacceptable rate from the bottom of boiler vessel 8, outwardly through tube 112.

The aforesaid operation wherein steam generated in boiler 8 is cooled and condensed to distilled water by passage through coil 100 in heat exchange with incoming, relatively cool supply water, results in a cooled supply of distilled water being discharged through outlet 104 into receiving vessel 105. If the distilled water flowing into vessel 105 is not at an acceptable temperature, adjustment can be made by rotatably varying the position of pointer 90 on the thermostatic controller. Since the bellows sensing element 76 of the thermostatic controller is immersed in supply water within condensing vessel 32, it will respond to changes in the temperature of distilled water flowing through coil 100 and outwardly through outlet 104 through corresponding variations in the temperature of supply water in condensing vessel 38. The supply water temperature will of course be affected by its heat exchange relation with vapor flowing through coil 32. If the temperature of distilled water being delivered into vessel 105 reaches an excessively high level, the temperature of supply water in condensing vessel 32 will of course rise. As a result, bellows 76 will expand, and shift actuating stem 78 laterally to the left as viewed in FIG. 4. This will move valve element 70 farther off of its seat or port 68 and thereby increase the flow of supply water into vessel 32. A greater cooling effect will then be achieved on the steam flowing through coil 100 and on the leaving distilled water, with a resultant reduction in its temperature to the desired level at which pointer 90 is set. As is indicated in FIG. 5, movement of pointer 90 to the left will increase the temperature of leaving distilled water and movement of pointer to the right or in a clockwise direction as viewed in FIG. 5, will lower the temperature of leaving distilled water.

Once supply hose 54 is connected to a source of cold water, and condensing vessel 32 primed with supply water to a level L-1, the distiller operates fully automatically by simply plugging and unplugging electrical supply cord 18. If supply cord 18 is unplugged after operation for a period of time, the resultant absence of a heat supply to boiler 8 through heating element 16 will of course stop the generation of steam. With no steam flowing through coil 100, the temperature of water surrounding bellows 76 and condensing vessel 32, will drop substantially. When this happens, bellows 76 will contract, thereby moving valve actuator stem 78 to the right as viewed in FIG. 5. Spring 72 will then act to tightly seat valve element 70 on valve port 68. Thus, the supply of incoming water will be cut off, and the unit will be completely shut down. Operation resumes automatically when the plug on electrical supply cord 18 is again connected to an electrical outlet. The level L-2 of water will be maintained in boiler vessel 8 from the preceding operation at the time of shutdown. The application of heat to this body of water in vessel 8 when the supply cord 18 is again connected will generate steam. As this steam flows through heat exchange coil 100 it will raise the temperature of supply water in condensing vessel 32. As a result, thermostat bellows 76 will be heated and expand so as to shift actuating stem 78 to the left as viewed in FIG. 4. This will open valve port 68 and permit supply water to again enter condensing vessel 32.

In FIGS. 6 and 7 I have shown a modified, preferred form of the thermostatic controller for regulating the flow to supply water into condensing vessel 32. As will the form of the thermostatic controller described above, supply water inlet hose 54 is connected to threaded end 57 of a fitting which includes a tubular member 62 projecting into the interior of condensing vessel 32. As with the arrangement shown in FIG. 4, tubular member 62 is connected by means of a nut 66a with a valve fitting. In FIGS. 6 and 7, there is shown a valve fitting 114 very similar to fitting 64. Nut 66a is threaded over an externally threaded extension on one end of this fitting in a manner similar to that shown with respect to nut 66 and the threaded end of fitting 64 in FIG. 4. Fitting 114 includes a threaded extension 114a on its opposite end within which a valve seat or port 116 is formed. A sleeve 118, internally threaded at one end thereof, threadedly receives threaded extension 114a of fitting 114 to assemble these components together. Sleeve 118 has a threaded aperture 120 at its opposite end into which a threaded extension 112 affixed to bellows 76a is screwed. Bellows 76a is of the same construction and operation as bellows 76 described above with respect to FIGS. 4 and 5. Bellows 76a bears at its outer end against upright segment 126a of a support bracket 126. Forwardly extending arms 126b and 126c of bracket 126 project at their forward ends into the interior of sleeve 118 through aligned, elongated slots 128, 129 on opposite sides thereof. The inner ends of bracket arms 126b, 126c are affixed to a cylindrical valve carrier 130 for movement therewith. Elongated valve pin or needle 132 projects from the forward end of valve carrier 130 for movement therewith. Valve spring 134 bears against the rear end of valve carrier 130, and is seated against the rear or base end of sleeve 118 as shown in FIG. 7. In this manner spring 134 serves to normally urge valve needle 132 into a seated position within valve seat or port 116. Unthreaded, forward end 122a of extension 122 serves as a guide for spring 134. A baffle or deflecting shield 124 of arcuate shape as shown in FIG. 6 is secured to the forward end of sleeve 118 in a friction fit therewith, and includes downwardly depending side walls 124a, 124b.

In operation, supply water entering through tubular member 62 flows through the interior of fitting 114 and valve port 116 past valve needle 132. Water exits from the interior of sleeve 118 through elongated slots 128 and 129. Baffle 124 serves to deflect incoming water downwardly into the interior of condensing vessel 32 to maintain the desired temperature gradient therein as noted above. As the temperature of leaving, distilled water increases, thereby increasing the temperature of supply water in vessel 32, bellows 76a expands. This has the effect of moving support bracket 126 to the left as viewed in FIG. 7, and thereby moving the valve needle 132 away from valve seat 116 to increase water flow therethrough. As the temperature of leaving distilled water decreases, bellows 76a contracts, and the opposite effect is achieved with the movement of valve needle 132 to the right and more tightly against valve seat 116 to restrict the flow of incoming water. The thermostatic controller shown in FIGS. 6 and 7 may be adjusted to warmer or colder settings of the temperature for leaving distilled water, by threadedly adjusting the position of bellows extension 122 within threaded aperture 120 of sleeve 118. As bellows 76a and extension 122 are rotated clockwise as viewed in FIG. 6, this will serve to draw bellows extension 122 and sleeve 118 and threaded extension 114a more tightly together. As a result, bracket 126 and valve needle 132 will be moved to the right as shown in FIG. 7 to seat more tightly within valve port 116. Rotating extension 122 and bellows 76a in the opposite, counter clockwise direction will have the effect of moving valve needle 132 farther away from port 116, and thus increasing water flow into condensing vessel 32.

Based on the foregoing, it will readily be appreciated that the water distiller disclosed herein is a highly efficient, compact unit lending itself to fully automatic operation, and permitting quick and easy disassembly for cleaning and servicing as required. It is anticipated that various changes may be made in the structure and arrangement of the component parts of the water distiller as disclosed herein without departing from the spirit and scope of my invention as defined by the following claims.

What is claimed is:

1. A water distiller assembly comprising:

a boiling chamber comprising a vessel having heating means operatively associated therewith for heating supply water in said vessel;

a condensing unit disposed above said boiling chamber, said condensing unit comprising a vessel having supply water inlet means connected thereto whereby supply water is contained in said vessel, and a separate, vapor flow passage disposed in heat exchange relation with supply water in said condensing vessel, and wherein said supply water inlet means comprises an inlet tube and a flow control valve connected therein, said valve having a valve element movable relative to a valve port for regulating the flow of supply water into said condensing vessel; and said vapor flow passage having a vapor inlet in fluid flow communication with the top of said boiling chamber and a fluid outlet for discharging distilled water externally of said water distiller assembly, whereby steam vapors generated in said boiling chamber rise into said vapor inlet, pass through said vapor flow passage and are cooled and condensed to distilled water which flows out through said fluid outlet;

a supply water condenser outlet tube extending from an inlet opening in the upper portion of said condensing vessel at a predetermined level of supply water therein downwardly into said boiling chamber and terminating at a discharge opening disposed below the normal level of supply water in said boiling chamber, the length of said supply water condenser outlet tube and the elevated location of said inlet opening thereto in said condensing vessel providing a column of supply water in said outlet tube sufficient to at least balance the vapor pressure generated in said boiling chamber, whereby preheated supply water flows by gravity through said outlet tube from said condensing vessel downwardly into said boiling chamber;

a thermostat controller operably associated with said valve element, said thermostat controller having sensing means responsive to the temperature of distilled water condensed in said vapor flow passage and operative to move said valve element in an opening direction relative to said valve port to increase the flow of supply water into said condensing vessel as the temperature of distilled water leaving said vapor flow passage increases.

2. A water distiller assembly as defined in claim 1 wherein:

said vapor flow passage comprises a circuitous, tubular passage extending downwardly from the upper portion of said condensing vessel at a level below said inlet opening to said supply water outlet tube and terminating at said fluid outlet in the lower portion of said condensing vessel, said vapor inlet extending to the top of said circuitous vapor flow passage and directing steam vapors first into the top of said circuitous vapor flow passage, whereby condensing and cooled vapors flow downwardly in said circuitous flow passage towards said fluid outlet, and a temperature gradient is provided in said supply water contained in said condensing vessel, with the coolest supply water being at the bottom thereof and the hottest, preheated supply water being at the top thereof for introduction into said outlet tube through said inlet opening thereof.

3. A water distiller assembly as defined in claim 1 and further including:

mineral water discharge passage means in the lower portion of said boiling chamber, said passage means havng an inlet at a predetermined water level in said boiling chamber and an outlet leading externally of said boiling chamber, said passage means being sized and shaped to provide a predetermined restriction to the outflow of residue water from said boiling chamber under the pressurizing influence of the vapor pressure generated in said boiling chamber so as to maintain a steady, predetermined outflow of mineral laden residue water from said boiling chamber.

4. A water distiller assembly as defined in claim 3 wherein:

said mineral water discharge passage means comprises a fluid receptacle in the bottom of said boiling chamber having a closed bottom end and an upwardly facing, open top end at said predetermined water level serving as said inlet, and an elongated tube of predetermined cross-sectional area having an open receiving end disposed inside of said fluid receptacle below the open top thereof, said tube extending upwardly from said receiving end a predetermined distance and thence leading to a point externally of said boiling chamber and serving as said mineral water outlet.

5. A water distiller assembly as defined in claim 4 wherein:

said fluid receptacle is in the form of a removable cup resting on the bottom of said boiling chamber and held in place by releasable detent means.

6. A water distiller assembly as defined in claim 1 further comprising:

adjustment means on said thermostat controller movable to change the setting of an actuating member for said valve element in such a way as to increase or decrease the flow of supply water through said flow control valve and thereby increase or decrease the temperature of distilled water leaving said vapor flow passage.

7. A water distiller assembly as defined in claim 1 wherein:
said sensing element is immersed in supply water contained in said condensing vessel, whereby said sensing element responds to changes in the temperature of distilled water in said vapor flow passage through corresponding variations in the temperature of supply water in said condensing vessel in heat exchange relation with vapor and distilled water flowing through said vapor flow passage.

8. A water distiller assembly as defined in claim 1 wherein:
said valve element is in the form of a tapered needle projecting into said valve port, said valve port being formed in a threaded member separable from said valve needle, and said valve needle being on a carrier member operatively linked to said sensing means for movement therewith towards and away from said valve port as the temperature of distilled water leaving said vapor flow passage increases and decreases; and
said adjustment means comprises a threaded extension on said sensing means threadedly adjustable into and out of threaded receiving means affixed to said threaded valve port member in such a way as to move said valve needle towards and away from said valve port to adjust the temperature setting of said thermostatic controller.

9. A water distiller assembly comprising:
a boiling chamber comprising a vessel having heating means operatively associated therewith for heating supply water in said vessel;
a condensing unit disposed above said boiling chamber and secured thereto, said condensing unit comprising separate supply water and vapor passage means disposed in heat exchange relation with each other, said supply water passage means being so constructed and arranged in fluid flow communication with a supply water inlet and an outlet means leading downwardly into said boiling chamber that supply water flows by gravity through said supply water passage means down into said boiling chamber, and said vapor passage means having an inlet connected to the top of said boiling chamber and a distilled water outlet leading externally of said condensing unit, whereby steam vapors generated in said boiling chamber rise into said vapor passage means and are cooled and condensed to distilled water by heat exchange with relatively cool supply water, and the supply water is preheated before flowing into said boiling chamber;
a supply water outlet tube comprising said outlet means from said supply water passage means of said condensing unit and extending downwardly from the interior of said condensing unit into said boiling chamber to a discharge point below the normal level of supply water in said boiling chamber, with the vapor pressure generated in said boiling chamber acting as a back pressure against the gravity flow of supply water through said outlet tube and providing a controlled flow of preheated supply water into said boiling chamber; and
mineral water discharge passage means in the lower portion of said boiling chamber having an inlet at a predetermined water level therein and an outlet leading externally of said boiling chamber, said mineral water discharge passage means comprising an upstanding fluid container in the bottom of said boiling chamber having a closed bottom end and an upwardly facing, open top end at said predetermined water level serving as said inlet, and an elongated tube of predetermined cross sectional area having an open receiving end disposed inside of said fluid container below the open top thereof, said tube extending upwardly from said receiving end a predetermined height and leading to a point externally of said boiling chamber as said mineral water outlet, the predetermined cross sectional area and height of said elongated tube providing a pressure drop such that a controlled outflow of mineral laden residue water will be maintained from said boiling chamber under the influence of vapor pressure generated therein.

10. A water distiller assembly as defined in claim 8 wherein:
said condensing unit is removably attached to the top of said boiling vessel;
the top of said boiling vessel is covered by a removable lid; and
said supply water outlet means and said vapor passage means inlet comprise tubes extending through said boiling vessel lid in fluid flow communication with said boiling chamber and condensing unit.

11. A water distiller assembly as defined in claim 10 wherein:
said condensing unit and said boiling vessel are removably attached together by detachable spring clips engaging external peripheral surfaces thereof, and said boiler vessel lid is removably affixed to the bottom of said condensing unit for removal therewith to permit access to the interior of said boiling vessel.

* * * * *